A. McELVEEN.
HONEY BEE QUEEN YARD.
APPLICATION FILED MAR. 17, 1916.
1,207,425.
Patented Dec. 5, 1916.
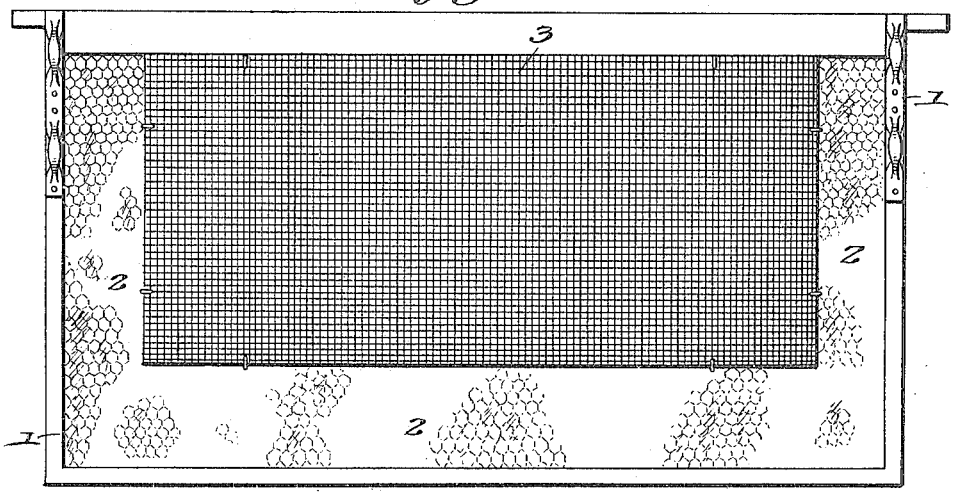
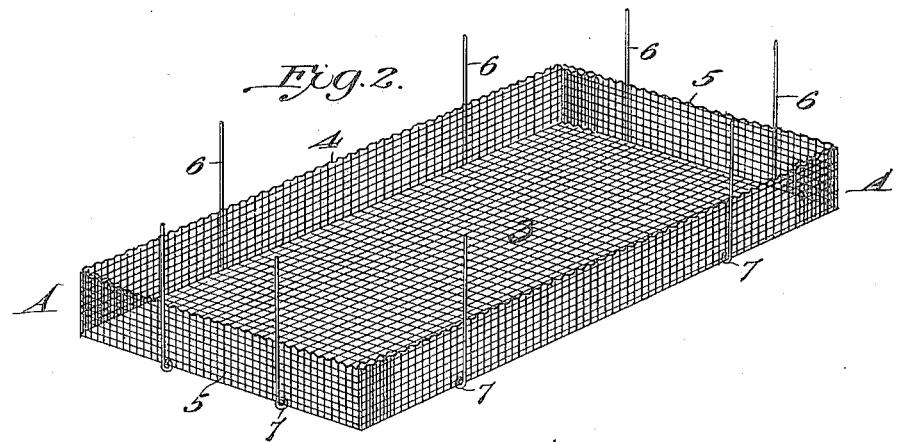
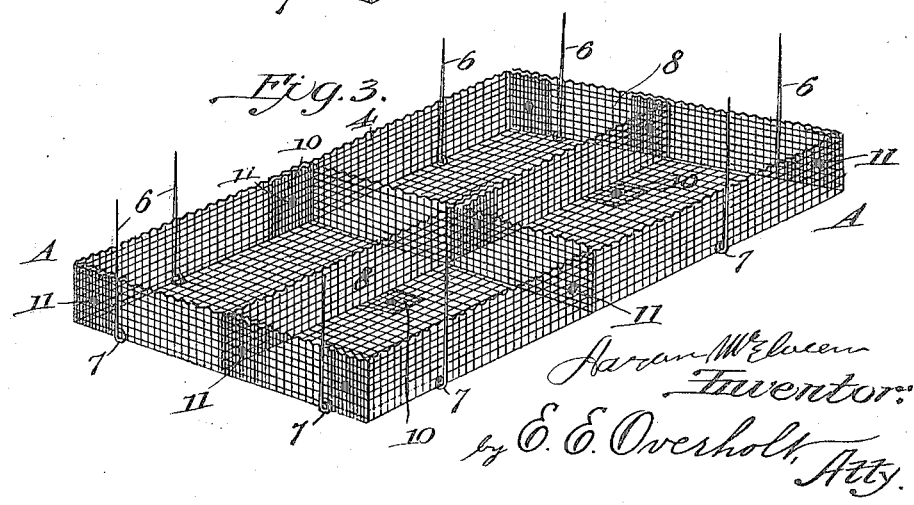

UNITED STATES PATENT OFFICE.

AARON McELVEEN, OF STILSON, GEORGIA.

HONEY-BEE QUEEN-YARD.

1,207,425.   Specification of Letters Patent.   Patented Dec. 5, 1916.

Application filed March 17, 1916. Serial No. 84,940.

*To all whom it may concern:*

Be it known that I, AARON McELVEEN, a citizen of the United States, residing at Stilson, in the county of Bulloch and State of Georgia, have invented certain new and useful Improvements in Honey-Bee Queen-Yards, of which the following is a specification.

My invention relates to devices for introducing queens and other bees into strange hives.

The object is to provide means by which the new bees whether they be queens or working bees, can be easily and quickly placed in the desired hive or removed therefrom, and by which they will be housed therein in such a way that they can have a certain degree of communication with the bees already in the hive, while at the same time being fully protected from their hostile attacks, till the bees in the hive cease to regard them as intruders and become friendly with them.

Another object is to provide convenient means for keeping queen bees for protracted periods of time, comfortably caged and fed, and always accessible, till they are wanted for use or for sale.

Still another object is to provide cheap and convenient means for the protection of queen cells before they are hatched out.

Other objects will appear in the subjoined description.

The device is specially useful for introducing new queens into a hive; or for introducing more bees into a weak hive.

It is a well known fact that honey bees are very jealous and watchful of their store of honey, so that if any strange bee, whether queen or working bee, be introduced into the hive, that bee seems to be at once taken either for a dead-beat that has come there to live off their labor eating up their store of honey, or else as a thief that has come to steal and carry away what they have laid up: and they are generally fierce and relentless in their attacks upon the life of the supposed intruder.

For many reasons, the matter of introducing queen bees into hives is specially important, and it is a great problem with bee raisers as to how this can be done without getting the queens killed. Actual experience has proved that the device herein set forth has solved that problem in a most satisfactory manner.

The principal feature of my device consists of a wire coop or cage provided with an open side, and having means for holding this side around its edges in close engagement with the flat side of a section of brood comb, so that the bees outside the cage cannot enter it, and the bees inside the cage cannot escape from it, till special provision is made therefor.

The invention consists in certain novel features and combinations of parts, as will be hereinafter described and claimed, reference being had to the accompanying drawings, in which—

Figure 1 is a side elevation of a section of brood comb with my improvement in operative position thereon. Fig. 2 shows an inverted plan view of my device removed from the brood comb; and, Fig. 3 is a similar view of the device showing it provided with partitions forming its interior into a plurality of compartments.

The numeral 1 designates a frame carrying a section 2 of brood comb.

My improved cage A is formed of finely woven wire or other open material and consists of a main section 3 having narrow side and end sections 4 and 5 respectively; said latter sections being bent preferably at right angles to the main section 3 and formed integral therewith. These side and end sections 4 and 5 are provided with a suitable number of securing pins or stickers 6, which are secured to said sections in any desired manner and project some distance beyond the outer edges of said sections, and may be made sharp at their outer ends. These pins can be secured to the side and end sections 4 and 5 with solder, but are shown in the drawings as being provided at their inner ends with bends 7 which are bent around one or more of the wires of the cage, and the shanks of these securing pins adjacent the bends 7 are plaited into the wires of the edge sections 4 and 5 of the cage, and are thus very securely held without solder.

In Fig. 3 of the drawings, I have shown the cage A provided with central longitudinal and transverse partitions 8 and 9 respectively which divide the cage into four separate compartments. As a means of convenient construction these partitions are formed at their ends and sides with integral right-angled sections 10 which sections are in turn secured to the cage by rivets 11. Of course, solder or other securing means make take the place of the rivets if desired.

In operation, a frame carrying a section of brood comb is removed from the hive, and the cage A is fastened on one side of the comb by simply forcing the securing pins or stickers 6 into the comb till the edges of the cage come down into engagement with the comb. The queen bee, or whatever bees are to be introduced into the hive are placed in the cage before its edges are pushed entirely down into engagement with the comb: or one edge or corner of the cage can be elevated enough above the comb to permit the bees to be put under: then the cage is pushed down again to shut the bees in.

Since the cage is made of finely woven wire, of course no bee can enter it to molest a queen or other bees that may be under it.

The edge sections 4 and 5 of the cage are usually made quite narrow so that the cage, when in operative position on a section of comb, will be conveniently received into the usual space between the frames, and therefore none of the other frames will have to be removed or rearranged in order to make room for a frame having my device attached to the brood comb carried thereby. While this only gives a shallow cage, yet it is deep enough for the bee or bees confined therein, to move about freely, and that is all that is necessary. Special attention however is called to fact that my cage is of unusual length and breadth: and in the present invention, the unusual area of the cage serves a special purpose, and therefore is of the essence of the invention, as will appear a little later.

The side area of brood-comb frames is much greater than that of the ordinary comb frames; and my device as shown in Fig. 1 covers a very large portion of the comb in one of these frames, and may be made large enough to cover all of one side of the comb.

The little wooden cage sometimes used for introducing queens into hives is very small, perhaps 1 inch by 2 inches; and when a queen is introduced into a hive in one of these cages the bees will ball up on the cage to fight her, and in that way often shut out all the air from her and smother her to death. They get all over the cage and cover it up, and in her efforts to get away from them or to get air, she sometimes crawls over the reticulated part of the cage, and in that way or other ways exposes her legs, and they get hold of them and pull them through the reticulations and gnaw them off, and sometimes they get hold of her wings and gnaw them off also. Hence it will be seen that many queen bees die or are killed outright before the bees in the hives where they are introduced will accept them. But owing to the size of my queen yard nothing of that sort can ever happen, for if the bees try to ball her, she simply crawls to another place: then they will scatter and go after her again; but all to no purpose: and so they finally have to give it up for a bad job. But in the mean time they have had so many rounds trying to catch her that they have all come to know her, and for that reason will all the sooner accept her.

Even if the queen bee does not choose to crawl away from the angry bees when they try to ball her, they cannot smother her in my queen yard, for air will reach her from the sides 4 and 5 of the cage, and from the parts of the main section 3 beyond where the bees are balled: and so in this instance, the unusual area of the cage confers upon it a useful function, not possessed by small cages.

Moreover the size of my improved queen yard gives a queen plenty of space to move about in, and protects her in comfort till the bees of a new hive become acquainted and friendly with her, all of which is an advantage.

Another important way of using my device is to place it over a frame of sealed brood with the queen under it. When the bees hatch out they will claim her for their mother, and the queen along with the young bees can then be released from the cage into the hive with perfect safety.

From the foregoing it will be seen that my queen yard is all that could be desired as a means of introducing queens into strange hives, so that one need never be lost if she is in proper condition when she is put in the cage. Where queen bees are kept for sale, one can be taken out of the cage whenever desired, and the cage returned to its place in the hive.

When the device is used to introduce more bees into a weak colony, as many bees are placed in each cage as it will comfortably accommodate, and when the bees in the hive have become sufficiently accustomed to the presence of the strangers there not to resent it, they may then be released into the hive by lifting one corner or side of the cage out of engagement with the comb sufficiently to permit the bees to crawl out. The sharp securing pins 6 will easily draw out of the brood comb without damaging it.

Aside from raising a corner or side of the cage out of engagement with the comb when it is desired to release bees from the cage or to permit other bees to enter it, there are different ways in which an opening may be made in the cage with shears; as for instance, two short parallel cuts may be made extending inwardly from the edge of one of the side sections 4 or 5, and spaced from each other, say a half inch or less; then the small section of wire between the two cuts can be raised at its free edge like a little door, and that will make a small opening through which the bees can pass in or out, one at a time. As a rule, however, with a little care, a corner of the cage can be raised just sufficiently to permit one bee at a time to pass under it, when it is desired to proceed with caution in letting them pass into or out of the cage.

When for any reason it is desired to keep queens apart when two or more of them are to be introduced into a hive at one time, I employ the form of my device illustrated in Fig. 3 of the drawings which is provided with a separate compartment for each queen. It should be borne in mind however that this arrangement is more than a multiplication of small cages; for if there is only one small cage, or a number of small cages, each by itself, the bees in the hive can ball each cage and smother the queen in it to death. But a queen cannot be smothered in that way in my cage, even though it be divided into small compartments, for the compartments are not closed against the passage of air from one compartment to another, but only against the passage of bees, and it has already been sufficiently pointed out why bees cannot ball a queen in my cage and smother her to death.

My device if carefully handled is practically indestructible, and may be used first with one brood comb and then another, as occasion may require. It is also very simple and inexpensive in construction.

Having thus described my invention, what I claim as new, and desire to secure by Letters Patent is:—

1. A device of the character described, comprising a cage formed of open material; and means for holding one side of said cage in engagement with a section of brood comb.

2. A device of the character described, comprising a cage formed of reticulated material and open at one side; and means for holding said opening in engagement with a section of brood-comb to cause the comb to form a closure for the opening.

3. A device of the character described, comprising an open-sided cage formed of reticulated material; and provided at its open side with means for engaging a section of brood-comb to hold the open side of the cage in engagement therewith, whereby to cause the comb to form a closure for said open side.

4. A device of the character described comprising an open-sided cage formed of reticulated material; and provided at its open side with means for removably engaging a section of brood comb to hold the open side of the cage in removable engagement therewith, whereby to cause the comb to form a closure for said open side, and to give the bees inclosed in the cage access to the comb.

5. A device of the character described, comprising an open-sided cage formed of reticulated material, and provided around its open side with securing pins projecting beyond said open side and adapted to penetrate a section of comb to hold the open side of the cage in removable engagement therewith, to cause the comb to form a removable side for the cage and to give the bees in the cage free access to the comb.

6. A device of the character described, comprising a cage formed of reticulated material; partitions in said cage forming the interior thereof into a plurality of compartments; and means for holding one side of said cage in engagement with a section of brood comb to give the bees in said compartments access to the comb.

7. A device of the character described, comprising a cage formed of reticulated material; reticulated partitions in said cage to form the interior thereof into a plurality of compartments adapted to permit the circulation of air from each compartment to the others; and means for holding one side of said cage in removable engagement with a section of comb, to give the bees in said compartments access to the comb.

In testimony whereof I affix my signature in the presence of two witnesses.

AARON McELVEEN.

Witnesses:
HOMER WHITE,
JOS. S. BRAINEN.